US008319785B2

(12) United States Patent
Roh

(10) Patent No.: US 8,319,785 B2
(45) Date of Patent: Nov. 27, 2012

(54) IMAGE DISPLAY SYSTEM AND METHOD FOR PREVENTING IMAGE TEARING EFFECT

(75) Inventor: Jong-Ho Roh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1310 days.

(21) Appl. No.: 12/072,552

(22) Filed: Feb. 27, 2008

(65) Prior Publication Data

US 2008/0204464 A1 Aug. 28, 2008

(30) Foreign Application Priority Data

Feb. 28, 2007 (KR) ........................ 10-2007-0020423

(51) Int. Cl.
*G06F 12/00* (2006.01)
*G09G 5/39* (2006.01)

(52) U.S. Cl. ........................................ 345/564; 345/531

(58) Field of Classification Search .................. 345/564, 345/531
See application file for complete search history.

(56) References Cited

U.S. PATENT DOCUMENTS 5,371,513 A * 12/1994 Drako et al. .................. 345/620
5,451,981 A * 9/1995 Drako et al. .................. 345/620
5,748,203 A * 5/1998 Tang et al. .................... 345/542
5,764,240 A * 6/1998 Herz ............................. 345/546
6,304,297 B1 * 10/2001 Swan ............................ 348/556
7,394,465 B2 * 7/2008 Toni .............................. 345/531
7,423,642 B2 * 9/2008 Peer et al. ...................... 345/422
7,752,647 B2 * 7/2010 Fung ............................... 725/93
2006/0187239 A1 8/2006 Clark-Lindh
2008/0165200 A1 * 7/2008 Chow et al. ................... 345/531

FOREIGN PATENT DOCUMENTS

KR 10-2006-0016251 2/2006
KR 10-2006-0042602 5/2006
KR 10-2006-0065374 6/2006

* cited by examiner

*Primary Examiner* — Daniel Washburn
(74) *Attorney, Agent, or Firm* — Onello & Mello LLP

(57) ABSTRACT

An image display system includes: a frame buffer including plurality of lines; a memory controller conducting writing and reading operations with the frame buffer; an image data provider supplying image data to the memory controller and generating a writing address; a display controller generating a reading address and receiving image data that is read from the frame buffer by the memory controller; a tearing-protection bus arbiter storing a burst length, receiving the writing and reading addresses, and selectively outputting the writing and reading addresses; and a display device displaying the image data by the display controller. The reading address contains a start address for the reading operation and the writing address contains a start address for the writing operation. If the writing and reading addresses are the same or if a difference between the start addresses for the writing and reading operations is less than the burst length, the tearing-protection bus arbiter outputs the reading address to the memory controller and holds the writing address.

23 Claims, 3 Drawing Sheets

IMAGE DISPLAY SYSTEM AND METHOD FOR PREVENTING IMAGE TEARING EFFECT

CROSS-REFERENCE TO RELATED APPLICATIONS

This U.S. non-provisional patent application claims priority under 35 U.S.C. §119 of Korean Patent Application No. 10-2007-0020423 filed in the Korean Intellectual Property Office on Feb. 28, 2007, the entire contents of which are incorporated herein by reference.

BACKGROUND

The present invention relates to image display systems. In particular, the present invention relates to an image display system and method capable of preventing an image tearing effect (hereinafter, referred to as a "tearing effect") by means of a single buffer.

An image display system is generally comprised of a frame buffer, a display controller, and a display device. The frame buffer includes pluralities of memory cells arranged in rows and columns. Each cell of the frame buffer stores image data to be displayed on the display device. The row of the frame buffer corresponds to a line. The frame buffer is correspondent with the display device in size. For example, if the display device has a panel of 320×240 pixels, the frame buffer is formed of 240 lines (i.e., rows). Each line is composed of memory cells (hereinafter, referred to as "cells") corresponding to 320 pixels. The display device supporting the array of 320×240 pixels is configured to display 320-pixel data on each of 240 lines.

In the image display system, the frame buffer stores image data that is to be presented into the display device. During a reading mode of the image display system, the display controller reads image data from the frame buffer and provides the read image data to the display device. The display device drives the image data to the display device for display. Image data are updated to the frame buffer and the updated image data are driven into the display device through reading and writing operations of the image display system.

In the image display system, a writing operation progresses faster than a reading operation while the writing operation coincides with the reading operation.

If the frame buffer is configured to include 240 lines, the writing and reading operations are sequentially conducted from the first line to the 240'th line of the frame buffer. During this operation, a line of the frame buffer is designated by an address, by which the writing or reading operation for image data is conducted to the line designated by the address.

While repeating those operations, addresses provided to the frame buffer in writing and reading operations may be the same. For example, there is a case that a writing operation for storing updated image data into the 50'th line of the frame buffer coincides with a reading operation to the 50'th line of the frame buffer by the display controller. During this, as the reading and writing operations of the image display system are running at the 50'th line of the frame buffer, addresses for the reading and writing operations become the same. Under the condition with the same addresses, since the writing operation proceeds faster than the reading operation, the updated image data is first stored in the 50'th line of the frame buffer. Afterward, the display controller provides the updated image data, not current image data, to the display device during the reading operation to the 50'th line of the frame buffer.

From the 50'th line of the frame buffer, updated image data is stored by a writing operation faster than a reading operation. Accordingly, the display controller reads the updated image data after the 50'th line of the frame buffer and provides the read updated image data to the display device. In this case, the current image data is presented on the lines before the 50'th line of the display device, while the updated image data is presented the lines after the 50'th line of the display device. The phenomenon that the current image data and the updated image data appear on an arbitrary border of lines is called the "tearing effect".

Generally, an image display system is operable in burst access by way of a burst mode. The image display system generates a start address for reading and writing operations. The burst access is conducted to a memory by generating addresses as much as a burst length established from the start address. That is, the image display system accesses the memory in units of burst length.

As an example, assuming that: a burst length is 8; a start address for a reading operation is correspondent to the 50'th line of the frame buffer; and a start address for a writing operation is correspondent to the 40'th line of the frame buffer, the reading operation is conducted along the 50'th through the 57'th lines and the writing operation is conducted along the 40'th through the 47'th lines. In this case, a difference between the start addresses of the reading and writing operations is larger than the burst length, without overlap between reading and writing addresses during the reading and writing operations. In contrast, if a start address for the reading operation is correspondent to the 50'th line of the frame buffer but a start address for the writing operation is correspondent to the 45'th line of the frame buffer, the reading operation is conducted along the 50'th through the 57'th lines but the writing operation is conducted along the 45'th through the 52'nd lines. In this case, a difference between the start addresses of the reading and writing operations is less than the burst length, reading addresses overlapping with writing addresses over the 50'th through the 52'th lines. Thus, in this case, there is no tearing effect.

Some image display systems employ a dual buffer in order to prevent the tearing effect. The dual buffer is formed of a pair of frame buffers. Current image data stored in one of the two frame buffers is presented into a display device by a reading operation of the image display system. While the current image data of one buffer of the dual buffer structure is being driven into the display device, updated image data is stored in the other buffer by a writing operation of the image display system. The image display system is able to prevent the tearing effect by alternately conducting reading and writing operations with the frame buffers of the dual buffer structure.

However, there is a drawback to the image display system having two frame buffers in that the system has increased size and current consumption.

SUMMARY OF THE INVENTION

The present invention is directed to solve the above-described drawbacks, providing an image display system and method capable of preventing an image tearing effect even with a single buffer.

According to one aspect, the present invention is directed to an image display system including: a frame buffer including plurality of lines; a memory controller conducting writing and reading operations with the frame buffer; an image data provider supplying image data to the memory controller and generating a writing address; a display controller generating a reading address and receiving image data that is read from the frame buffer by the memory controller; a tearing-protection bus arbiter storing a burst length, receiving the writing and reading addresses, and selectively outputting the writing and reading addresses; and a display device displaying the image data via the display controller. The reading address contains a start address for the reading operation and the writing address contains a start address for the writing operation. If the writing and reading addresses are the same or if a difference between the start addresses for the writing and reading operations is less than the burst length, the tearing-protection bus arbiter outputs the reading address to the memory controller and holds the writing address.

In one embodiment, if the writing address is interrupted while the reading address is supplied from the tearing-protection bus arbiter, the memory controller holds the writing operation and conducts the reading operation.

In one embodiment, the writing address designates a line of the frame buffer to store the image data, and/or the reading address designates a line of the frame buffer in which the image data is stored.

In one embodiment, the writing operation is faster than the reading operation.

In one embodiment, the memory controller conducts the writing and reading operations at the same time.

In one embodiment, during the writing operation, the memory controller stores image data, which is input from the image data provider, into a line of the frame buffer which is designated by the writing address provided from the tearing-protection bus arbiter.

In one embodiment, during the reading operation, the memory controller reads the image data from a line of the frame buffer that is designated by the reading address provided from the tearing-protection bus arbiter.

In one embodiment, the image data provider and the display controller are master blocks.

In one embodiment, the tearing-protection bus arbiter includes: a register set storing the start address, an end address, the burst length, and priority information of master blocks; an arbiter logic block receiving the writing and reading addresses; an address comparator operating to compare the writing address with the reading address and compare the burst length provided from the register set with a difference between the start addresses for the reading and writing operations if the writing address provided from the image data provider and the reading address provided from the display controller are between the start and end addresses provided from the register set; and a bus request controller regulating the arbiter logic block to selectively output the writing and reading addresses in response to a comparison result of the address comparator and the priority information of the master blocks that is provided from the register set. The bus request controller operates to control the arbiter logic block to output the reading address and hold the writing address in response to the comparison result and the priority information of the master blocks if the writing and reading addresses are the same or if a difference between the start addresses for the reading and writing operations is less than the burst length.

In one embodiment, the start address designates the first line of the frame buffer and/or the end address designates the last line of the fame buffer.

In one embodiment, the priority information of the master blocks represents an output sequence of the writing and reading addresses.

According to another aspect, the present invention is directed to a method of displaying an image in an image display system having a frame buffer that includes a plurality of lines. The method is comprised of: generating writing and reading addresses; comparing the writing address with the reading address and comparing a burst length stored in the system with a difference between the reading and writing addresses; alternatively conducting writing and reading operations for the frame buffer in response to a result of the comparison; and displaying image data, that is read from the frame buffer, by the reading operation. The reading address contains a start address for the reading operation and the writing address contains a start address for the writing operation. Alternatively conducting the writing and reading operations is comprised of holding the writing operation to the frame buffer and conducting the reading operation in response to the comparison result if the writing and reading addresses are the same and a difference between the start addresses for the reading and writing operations is less than the burst length.

In one embodiment, the writing operation is carried out by receiving the writing address and image data and storing the externally provided image data in a line of the frame buffer that is designated by the writing address.

In one embodiment, the reading operation is carried out by receiving the reading address and reading the image data from a line of the frame buffer that is designated by the reading address.

In one embodiment, the writing address designates a line of the frame buffer to store the image data and/or the reading address designates a line of the frame buffer in which the image data is stored.

In one embodiment, the writing operation is faster than the reading operation.

In one embodiment, comparing the writing address, the reading addresses, and the burst length is comprised of: storing the start address, an end address, the burst length, and priority information of master blocks; providing the writing and reading addresses; comparing the writing address with the reading address and comparing the burst length with a difference between the start addresses for the reading and writing operations if the writing and reading addresses are interposed between the start and end addresses; and providing the priority information of the master blocks and controlling the writing and reading addresses to be alternatively output in response to the comparison result and the priority information of the master blocks. Controlling the writing and reading addresses to be alternatively output is carried out by outputting the reading address and holding the writing address in response to the comparison result and the priority information of the master blocks if the writing and reading addresses are the same or if the difference between the start addresses for the reading and writing operations is less than the burst length.

In one embodiment, the start address designates the first line of the frame buffer and/or the end address designates the last line of the fame buffer.

In one embodiment, the priority information of the master blocks represents an output sequence of the writing and reading addresses.

A further understanding of the nature and advantages of the present invention herein may be realized by reference to the remaining portions of the specification and the attached drawings.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
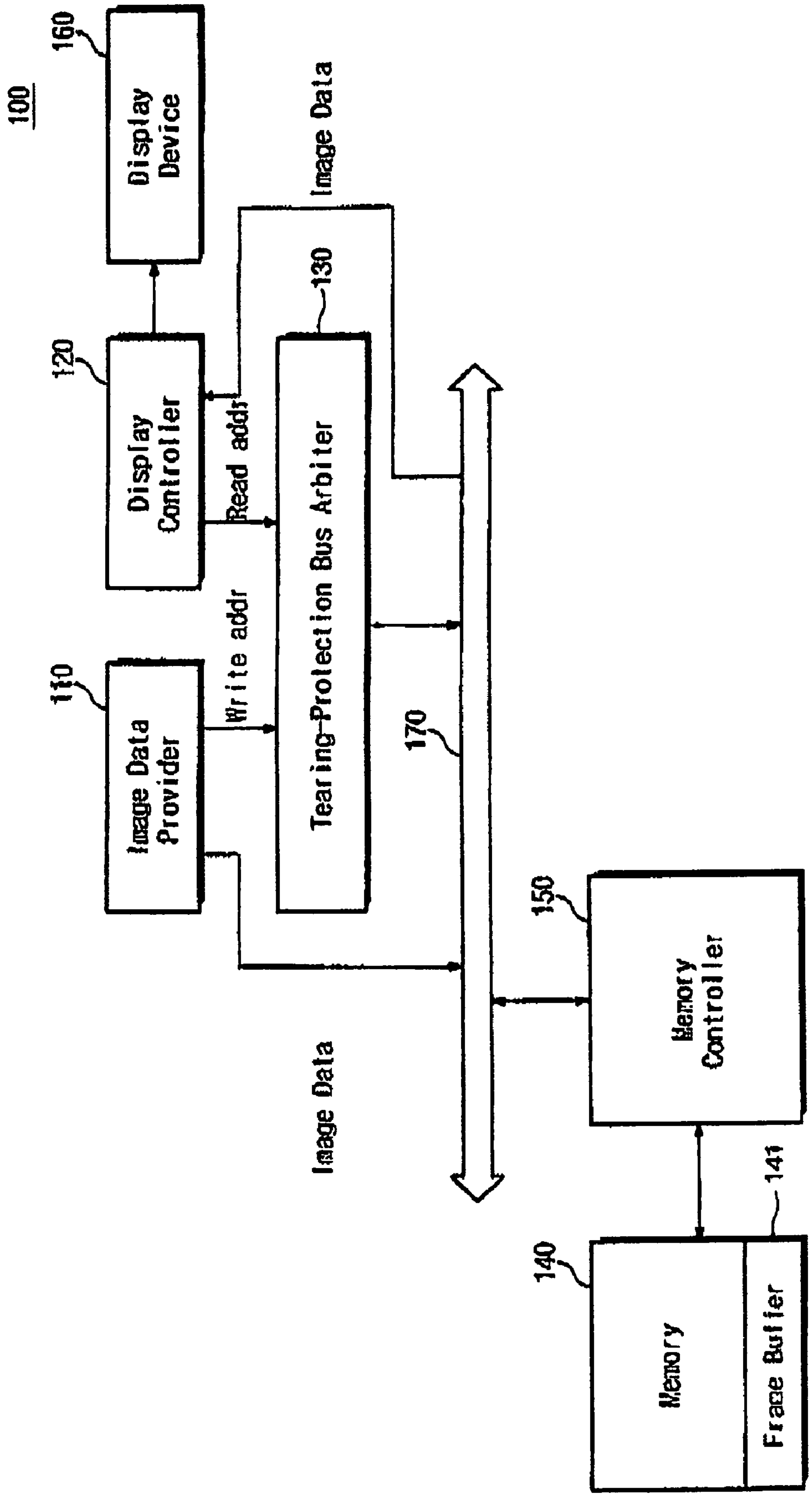
FIG. 1 is a block diagram of an image display system according to an embodiment of the present invention.

FIG. 1 is a block diagram of an image display system according to an embodiment of the present invention.

Referring to FIG. 1, the image display system 100 is comprised of an image data provider 110, a display controller 120, a tearing-protection bus arbiter 130, a memory 140, a memory controller 150, and a display device 160. The image data provider 110 and the display controller 120 are also called master blocks. The memory 140 includes a frame buffer 141.

The frame buffer 141 of the memory 140 includes pluralities of memory cells arranged in rows and columns. Each cell of the frame buffer stores image data to be driven into the display device 160. The rows of the frame buffer 141 correspond to lines in the display device 160. The frame buffer 141 is correspondent with the display device 160 in size. For example, if the display device 160 has a panel of 320×240 pixels, the frame buffer 141 is formed of 240 lines (i.e., rows). Each line is composed of memory cells (hereinafter, referred to as "cells") corresponding to 320 pixels. The display device 160 supporting the array of 320×240 pixels is configured to display 320-pixel data on each of 240 lines.

The image data provider 110 receives image data from an external system memory (not shown). The image data provider 110 applies the image data to the memory controller 150 by way of a system bus 170. Additionally, the image data provider 110 generates and provides addresses to the memory controller 150 through the system bus 170 under control of the tearing-protection bus arbiter 130. The address generated from the image data provider 110 is provided to designate a row position of the memory 140, which is arranged to store image data, and referred to hereinafter to as a "writing address."

The image data provider 110 sequentially generates addresses as long as a burst length from a start address for a writing operation of a burst mode, and provides the generated addresses to the memory controller 150 through the system bus 170 under control of the tearing-protection bus arbiter 130. During the writing operation, the generated addresses are writing addresses. Thus, the start address for the writing operation is also a writing address.

The image data provider 110 is comprised of a 2-dimensional (2D) accelerator (not shown), a 3-dimensional (3D) accelerator (not shown), a rotator (not shown), and a scaler (not shown). The 2D accelerator reads image data from the external system memory for 2D image data display on the display device 160. The 3D accelerator reads image data from the external system memory for the purpose of 3D image data display on the display device 160. The rotator makes image data rotate on the display device 160, rotating the image data for display. For instance, if there is a need for rotating an image of a photo-shop screen to 90°, the rotator rotates read image data to 90°. The scaler converts an image signal of television, a video cassette recorder, or DVD player into an RGB signal and adjusts a size of image data. Image data read from the external system memory and processed thereby are provided to the memory controller 150 by way of the system bus 170.

The display controller 120 reads image data from the memory 130 and provides the read image data to the display device 160. Practically, the display controller 120 receives image data through the system bus 170 from the memory 130 by operation of the memory controller 150.

The display controller 120 generates and provides addresses to the memory controller 150 through the system bus 170 under control of the tearing-protection bus arbiter 130. The address generated from the display controller 120 is provided to designate a row position of the memory 140, in which image data to be read is stored, and referred to hereinafter as a "reading address."

The display controller 120 sequentially generates addresses as long as a burst length from a start address for a reading operation of the burst mode, and provides the generated addresses to the memory controller 150 through the system bus 170 under control of the tearing-protection bus arbiter 130. During the reading operation, the generated addresses are reading addresses. Thus, the start address for the reading operation is also a reading address. Practically, the reading address designates a line of the frame buffer 141.

The tearing-protection bus arbiter 130 grants bus priority to the master blocks 110 and 120 in accordance with internally stored priority information of the master blocks. Granting bus priority means an operation of selectively providing the memory controller 150 with writing and reading addresses that are supplied from the master blocks 110 and 120.

The memory controller 150 stores image data, which is supplied through the system bus 170, into the frame buffer 141 during the writing operation in the image display system 100. The memory controller 150 reads image data from the frame buffer 141, during the reading operation, and provides the read image data into the display controller 120 by way of the system bus 170.

With reference to the above-described operations of the elements of the image display system 100, the writing and reading operations of the image display system 100 are in accordance with the following description.

If, for example, the frame buffer 141 includes 240 lines, the writing or reading operation of the image display system 100 is carried out from the first line to the 240'th line of the frame buffer 141 in sequence. Thus, although the writing and reading operations are conducted at the same time, there is a time gap between the writing and reading operations (this case will be detailed below with reference to FIG. 3).

In the writing operation of the image display system 100, the image data provider 110 provides image data to the memory controller 150 by way of the system bus 170. Further, the image data provider 110 provides a writing address to the tearing-protection bus arbiter 130. During this operation, the tearing-protection bus arbiter 130 grants the image data provider 110 bus priority, providing the memory controller 150 with a writing address by way of the system bus 170.

The memory controller 150 applies the writing address to the memory 140. The writing address is decoded by the memory 140, designating its corresponding line of the frame buffer 141. The memory controller 150 stores image data in the line of the frame buffer 141 which is designated by the writing address.

In the reading operation of the image display system 100, the display controller 120 provides a reading address to the tearing-protection bus arbiter 130. During this operation, the tearing-protection bus arbiter 130 grants the display controller 120 bus priority, providing the memory controller 150 with the reading address by way of the system bus 170.

The memory controller 150 applies the reading address to the memory 140. The reading address is decoded by the memory 140, designating its corresponding line of the frame buffer 141. The memory controller 150 reads image data from the line of the frame buffer 141 which is designated by the reading address.

The display controller 120 receives the image data, which is read out by the memory controller 150, through the system bus 170. The display controller 120 applies the image data into the display device 160. The display device 160 enables the image data to be driven for display.

The image display system 100 is able to conduct the writing and reading operations at the same time. While the image display system 100 is executing the writing and reading operations, the tearing-protection bus arbiter 130 selectively provides writing and reading addresses to the memory controller 150 in compliance with internal priority information of the master blocks 110 and 120. The memory controller 150 coincidently conducts the writing and reading operations to lines of the frame buffer 141 which are designated by the selective writing and reading addresses.

The memory controller 150 first receives a writing address and then executes the writing operation for a line of the frame buffer 141 which is designated by the writing address. During this operation, the memory controller 150 accepts a reading address although the writing operation for the line of the frame buffer 141 is still in progress, and begins the reading operation to a line of the frame buffer 141 which is designated by the reading address. Therefore, the coincident writing and reading operations of the image display system 100 effectively allows the memory controller 150 to conduct the writing and reading operations at the same time.

If there is a need to drive the display device with new image data provided from the external system memory, the tearing-protection bus arbiter 130 first supplies a writing address to the memory controller 150 by way of the system bus 170. In the case of driving the display device with previous image stored in the frame buffer 141, the tearing-protection bus arbiter 130 first supplies a reading address into the memory controller 150 by way of the system bus 170. In addition, the tearing-protection bus arbiter 130 is able to provide writing and reading addresses to the memory controller 150 through the system bus 170 alternately or in another sequence. This approach to providing addresses is predetermined by a user with reference to priority information.

In the image display system 100, the writing operation proceeds faster than the reading operation. Thus, as described above with reference to the general case, even when the reading and writing operations are coincidently conducted in the image display system 100, the same address for reading and writing can be provided to the tearing-protection bus arbiter 130. In addition, as also described above, when the image display system 100 uses a burst access function, a difference between start addresses of the reading and writing operations may be smaller than a burst length. If the start addresses of the reading and writing operations are different from each other in size less than the burst length, a reading address may overlap with a writing address as described above.

In this case, the tearing-protection bus arbiter 130 grants bus priority to the display controller 120, not to the image data provider 110. Thus, the tearing-protection bus arbiter 130 does not provide the memory controller 150 through the system bus 170 with a writing address supplied from the image data provider 110. As the memory controller 150 does not receive the writing address, the writing operation is disabled. That is, the writing operation of the image display system 100 is held up. As the tearing-protection bus arbiter 130 grants bus priorities to the display controller 120, a reading address is provided to the memory controller 150 by way of the system bus 170. Description of the reading operation subsequent thereto will not be repeated because it is the same as described above.

After completing the reading operation for a line of the frame buffer 141 which is designated by the reading address, the display controller 120 provides a reading address to the tearing-protection bus arbiter 130 in order to designate the next line of the frame buffer 141. When the image display system 100 uses the burst access function in the burst mode, a start address for the next reading operation is provided into the tearing-protection bus arbiter 130.

During this operation, as the writing address is being held, the new reading address provided from the display controller 120 becomes different from the writing address provided from the image data controller 110. With a difference between the writing and reading addresses, the tearing-protection bus arbiter 130 provides the held writing address to the memory controller 150 by way of the system bus 170.

In the burst mode of the image display system 100 for the burst access, a difference between a start address for the next reading operation and a start address for the held writing operation is larger than a predetermined burst length. For instance, assuming that: a burst length is 8; a start address for the reading operation is correspondent to the 50'th line of the frame buffer 141; and a start address for the writing operation is correspondent to the 45'th line of the frame buffer 141, the reading operation is conducted for the 50'th through the 57'th lines and the writing operation is conducted for the 45'th through the 52'nd lines. In this case, a difference between the start addresses for the reading and writing operations is smaller than the burst length, so the writing operation is held up and the reading operation is conducted. A start address for the next reading operation is correspondent with the 58'th line of the frame buffer 141. In this case, a difference between a start address for the reading operation and a start address for the held writing operation is larger than the burst length. Accordingly, the tearing-protection bus arbiter 130 provides the held writing address to the memory controller 150 through the system bus 170.

In this case, the held writing operation is then resumed as described above.

As a result, the image display system 100 holds the writing operation but conducts the reading operation when writing and reading addresses are equal to each other by the operation of the tearing-protection bus arbiter 130. Therefore, it is able to prevent the tearing effect that simultaneously displays updated and current images up and down on an arbitrary line of the display device 160 in the image display system 160.

Figure 2:
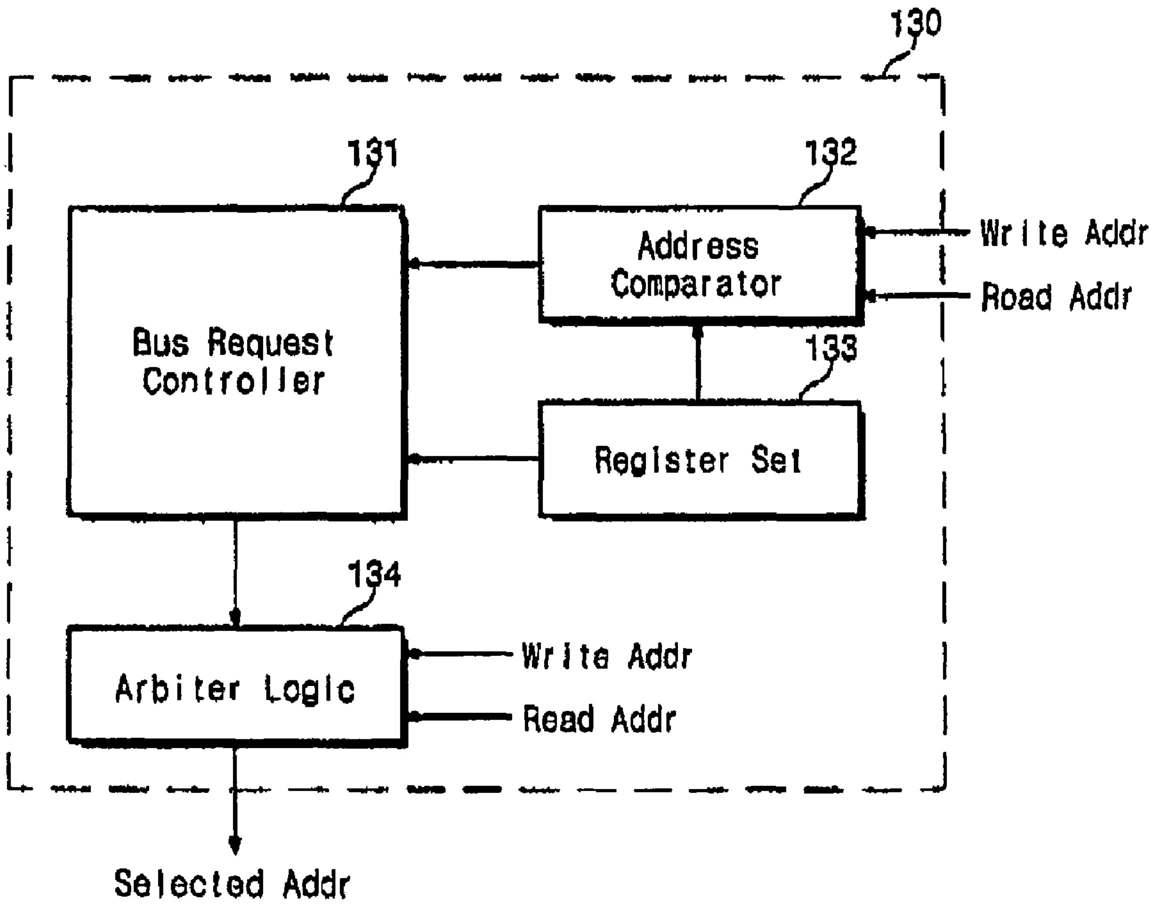
FIG. 2 is a block diagram of one embodiment of the tearing-protection bus arbiter shown in FIG. 1.

FIG. 2 is a block diagram of the tearing-protection bus arbiter 130 shown in FIG. 1.

Referring to FIG. 2, the tearing-protection bus arbiter 130 according to an embodiment of the present invention is comprised of a bus request controller 131, an address comparator 132, a register set 133, and an arbiter logic block 134.

The register set 133 stores a start address, an end address, a burst length, and priority information of the master blocks 110 and 120. The start address designates the first line of the frame buffer 141 and the end address designates the last line of the frame buffer 141. The start and end addresses stored in the register set 133 are provided into the address comparator 132. If there are writing and reading addresses, which are provided from the master blocks 110 and 120, between the start and end addresses, the address comparator 132 operates to compare the writing and reading addresses with each other.

Unless there are writing and reading addresses, which are provided from the master blocks 110 and 120, between the start and end addresses, the address comparator 132 does not compare the reading address with the writing address. For instance, if the image data provider 110 provides the memory 140 with image data to be applied into the display device 160 later, not presently, the image data is stored in another region of the memory 140, other than the frame buffer 141. In this case, the writing address supplied from the image data provider 110 does not designate a line of the frame buffer 141 and is absent between the start and end addresses. Thus, the address comparator 132 does not compare the writing and reading addresses, which are provided from the master blocks 110 and 120, with each other.

The burst length stored in the register set 133 is provided to the address comparator 132. In the burst mode of the image display system 100, the address comparator 132 operates to compare the burst length with a difference between a start address of the reading operation and a start address of the writing operation.

The bus request controller 131 operates to control the arbiter logic block 134 in response to a result of the address comparator 132 and priority information of the master blocks 110 and 120 which is provided from the register set 133.

The arbiter logic block 134 receives the writing and reading addresses from the master blocks 110 and 120, and selectively outputs the writing and reading addresses by the memory controller 150. The writing and reading addresses are provided to the memory controller 150.

In the condition that the image display system 100 conducts the writing and reading operations at the same time, an operation of the tearing-protection bus arbiter 130 is in accordance with the following description.

The address comparator 132 receives a writing address from the image data provider 110 and a reading address from the display controller 120. The address comparator 132 further receives a start address, an end address, and a burst length from the register set 133. The address comparator 132 operates to compare the writing address with the reading address if the writing and reading addresses are interposed between the start and end addresses. The address comparator 132 provides to the bus request controller 131 with a comparing result of the writing and reading addresses. In the burst mode, the address comparator 132 provides the bus request controller 131 with a result of comparing the burst length with a difference between the start addresses of the reading and writing operations.

The bus request controller 131 receives a comparison result from the address comparator 132 and priority information of the master blocks 110 and 120 from the register set 133. If a reading address is different from a writing address or if a difference between start addresses of the reading and writing operations is larger than the predetermined burst length, the bus request controller 131 regulates the arbiter logic block 134 to selectively output the writing and reading addresses in response to the comparison result and the priority information of the master blocks 110 and 120. Thus, the arbiter logic block 134 selectively provides the writing and reading addresses to the memory controller 150 through the system bus 170 by the bus request controller 131. The image display system 100 then begins the writing and reading operations as described above.

On the other hand, if a reading address is identical to a writing address or if a difference between start addresses of the reading and writing operations is smaller than the predetermined burst length, the bus request controller 131 regulates the arbiter logic block 134 not to select the writing and reading addresses in response to the comparison result and the priority information of the master blocks 110 and 120. Thus, in this case, the arbiter logic block 134 holds the writing address, without output of the writing address, by the bus request controller 131. Also, the arbiter logic block 134 provides the reading address to the memory controller 150 by way of the system bus 170. Afterward, the image display system 100 conducts only the reading operation, but the writing operation is held up.

After completing the reading operation, the display controller 120 provides the tearing-protection bus arbiter 130 with a reading address for the next line of the frame buffer 141. Alternatively, as described above, the display controller 120 provides the tearing-protection bus arbiter 130 with the next start address for the reading operation. Thus, the reading address is supplied to the address comparator 132 and the arbiter logic block 134. During this operation, as the writing address is held up since the previous reading operation, the reading address provided from the display controller 120 is different from the writing address. Thus, the address comparator 132 informs the bus request controller 131 that the reading and writing addresses are different from each other. Here, a difference between the next start address for the reading operation and the held writing address becomes larger than the burst length.

In this case, as described above, the arbiter logic block 134 selectively provides the writing and reading addresses to the memory controller 150 through the system bus 170 by the bus request controller 131. The image display system 100 then begins the writing and reading operations as described above.

Figure 3:
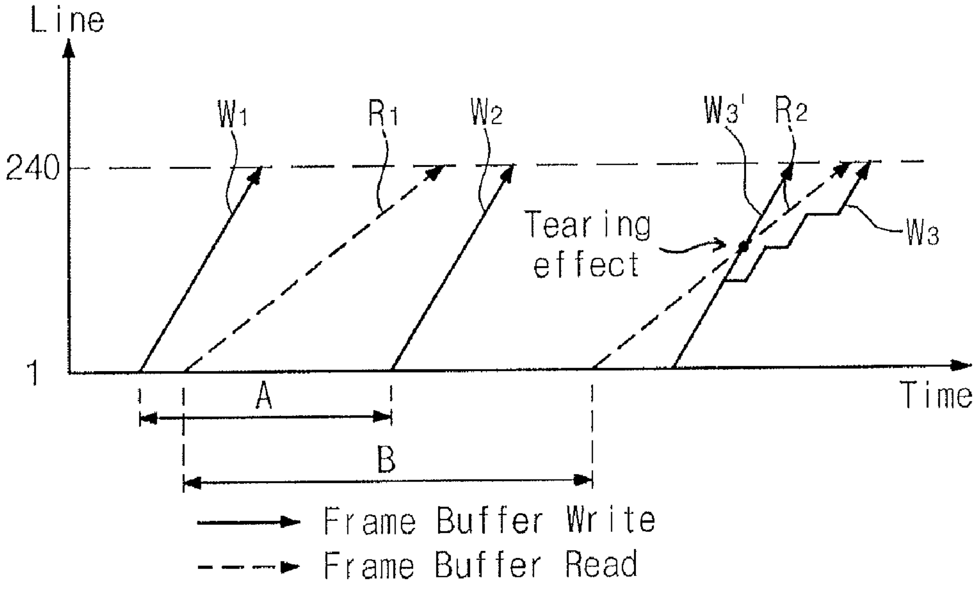
FIG. 3 is a graphic diagram relatively showing reading and writing rates in an image display system according to the present invention.

FIG. 3 is a graphic diagram relatively showing reading and writing rates in the image display system according to the present invention.

In FIG. 3, the reading and writing rates of the image display system 100 are depicted for the exemplary condition in which the frame buffer 141 and the display device 160 are each configured with 240 lines and equal to each other in size.

Referring to FIG. 3, solid lines W1~W3 and W3' (hereinafter, referred to as 'writing lines') show features of writing image data from the first line to the 240'th line of the frame buffer 141 along the time during the writing operation in the image display system 100. The writing lines W1~W3 represent the writing rates of the image display system 100. Dotted lines R1 and R2 (hereinafter, referred to as "reading lines") show features of reading image data from the first line to the 240'th line of the frame buffer 141 along the time during the reading operation in the image display system 100. The reading lines R1 and R2 represent the reading rates of the image display system 100.

The writing line W1 shows the process of storing the first image data into the frame buffer 141. The writing line W2 shows the process of storing the second image data into the frame buffer 141. The writing lines W3 and W3' show the process of storing the third image data, which is updated, into the frame buffer 141. Each writing operation has its own delay. The writing line W3' is correspondent to the case of proceeding the reading operation without holding the writing operation when writing and reading addresses are the same. The writing line W3 represents a feature of the writing operation for the third image data by the image display system 100 including the tearing-protection bus arbiter 130.

The reading line R1 shows a process of reading the first image data from the frame buffer 141. The reading line R2 shows a process of reading the second image data from the frame buffer 141. Each reading operation has its own delay.

The reading and writing operations of the image display system 100 in conjunction with FIG. 3 are as same as described above.

An interval A is correspondent with a difference between start points (or start addresses) for writing current image data and the next image data. An interval B is correspondent with a difference between start points for reading current image data and the next image data. In the image display system 100, the writing operation is conducted faster than the reading operation, so the interval A is shorter than the interval B.

When the writing and reading operations are coincidently conducted in the image display system 100, a start point for writing image data into the first line of the frame buffer 141 may be identical to or different from a start point for reading the image data from the frame buffer 141. But, since the interval A is shorter than the interval B, the start points for writing and reading image data into and from the first line become different as the image data is updated even though the writing and reading start points for the first line of the frame buffer 141 were the same. For that reason, as shown in FIG. 3, the writing and reading start points are established to be different from each other.

With reference to the writing and reading lines W1 and R1 shown in FIG. 3, the image display system 100 conducts the writing and reading operations for the first image data. During this operation, as the writing operation proceeds faster than the reading operation in the image display system 100, the writing operation for the first image data is completed earlier than the reading operation for the first image data. Although the writing operation for the first image data has been completed, the reading operation for the first image data is in progress.

Referring to the writing line W2 shown in FIG. 3, the image display system 100 then begins the writing operation for the second image data that is updated, even though the reading operation for the first image data has not been completed. Referring to the reading line R2 and the writing lines W3 and W3', the image display system 100 conducts the reading operation for the second image data after completing the writing operation for the second image data. During this, the image display system 100 begins the writing operation for the third image data that is updated, even though the reading operation for the second image data has not been completed.

In this case, as shown in FIG. 3, the writing line W3' and the reading line R2 may meet with each other at an intersection. The intersection between the writing line W3' and the reading line R2 means there is occurrence of a tearing effect. Such a tearing effect is caused because the writing operation is conducted faster than the reading operation. If a tearing effect occurs, the image display system 100 conducts the writing and reading operations for the same line of the frame buffer 141. Accordingly, when there is a tearing effect, the reading and writing addresses are the same.

An exemplary operation involved in a tearing effect by the writing and reading lines W3' and R2 shown in FIG. 3 will be now described. If there is generated a tearing effect during the writing and reading operations for, for example, the 100'th line of the frame buffer 141, the writing and reading addresses thereof are the same. In this case, the image display system 100 stores the third data into the first through the 99'th lines of the frame buffer 141 after reading the second image data from the first through the 99'th lines of the frame buffer 141. Thus, the display device 160 displays an image by the second image data from the first to the 99'th lines thereof. But, since the 100'th through the 240'th lines of the frame buffer 141 are first filled with the third image data by the writing operation earlier than the reading operation, those lines store the third data. Then, the image display system 100 conducts the reading operation for the third image data stored in the 100'th through the 240'th lines of the frame buffer 141. Accordingly, the display device 160 displays an image by the third image data from the 100'th to the 240'th lines thereof.

As shown by the writing line W3 of FIG. 3, if the writing and reading addresses are the same, the image display system 100 including the tearing-protection bus arbiter 130 does not conduct the writing operation. Thus, when the writing and reading addresses are the same, the image display system 100 activates the reading operation but holds the writing operation. But, if the equalizing condition between the writing and reading addresses occurs again, the image display system 100 holds the writing operation again. Thus, it prevents the tearing effect by the operation of the image display system 100.

Although not specifically illustrated in FIG. 3, in the burst mode of the image display system 100, the reading and writing addresses may be the same if a difference between the start addresses for the reading and writing operations is smaller than the burst length. Therefore, in this case, by holding the writing operation, the tearing effect is prevented in the image display system 100 as shown in FIG. 3.

As a result, the tearing effect is prevented by means of the tearing-protection bus arbiter 130 even while the image display system 100 is equipped with a singularity of the frame buffer 141.

In summary, the image display system according to the present invention is prevents a tearing effect that may occur at the display device thereof.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display system comprising:

a frame buffer including plurality of lines;

a memory controller conducting writing and reading operations with the frame buffer;

an image data provider supplying image data to the memory controller and generating a writing address;

a display controller generating a reading address and receiving image data that is read from the frame buffer by the memory controller;

a tearing-protection bus arbiter storing a burst length, receiving the writing and reading addresses, and selectively outputting the writing and reading addresses; and a display device displaying the image data via the display controller, wherein the reading address contains a start address for the reading operation and the writing address contains a start address for the writing operation, wherein if the writing and reading addresses are the same or if a difference between the start addresses for the writing and reading operations is less than the burst length, the tearing-protection bus arbiter outputs the reading address to the memory controller and holds the writing address.

2. The image display system as set forth in claim 1, wherein if the writing address is interrupted while the reading address is supplied from the tearing-protection bus arbiter, the memory controller holds the writing operation and conducts the reading operation.

3. The image display system as set forth in claim 1, wherein the writing address designates a line of the frame buffer to store the image data.

4. The image display system as set forth in claim 1, wherein the reading address designates a line of the frame buffer in which the image data is stored.

5. The image display system as set forth in claim 1, wherein the writing operation is faster than the reading operation.

6. The image display system as set forth in claim 1, wherein the memory controller conducts the writing and reading operations at the same time.

7. The image display system as set forth in claim 6, wherein during the writing operation, the memory controller stores image data, which is input from the image data provider, into a line of the frame buffer which is designated by the writing address provided from the tearing-protection bus arbiter.

8. The image display system as set forth in claim 6, wherein during the reading operation, the memory controller reads the image data from a line of the frame buffer that is designated by the reading address provided from the tearing-protection bus arbiter.

9. The image display system as set forth in claim 1, wherein the image data provider and the display controller are master blocks.

10. The image display system as set forth in claim 1, wherein the tearing-protection bus arbiter comprises:

a register set storing a frame buffer start address, a frame buffer end address, the burst length, and priority information of master blocks;

an arbiter logic block receiving the writing and reading addresses;

an address comparator operating to compare the writing address with the reading address and compare the burst length provided from the register set with a difference between the start addresses for the reading and writing operations if the writing address provided from the image data provider and the reading address provided from the display controller are interposed between the frame buffer start and end addresses provided from the register set; and a bus request controller regulating the arbiter logic block to selectively output the writing and reading addresses in response to a comparison result of the address comparator and the priority information of the master blocks that is provided from the register set, wherein the bus request controller operates to control the arbiter logic block to output the reading address and hold the writing address in response to the comparison result and the priority information of the master blocks if the writing and reading addresses are the same or if a difference between the start addresses for the reading and writing operations is less than the burst length.

11. The image display system as set forth in claim 10, wherein the frame buffer start address designates the first line of the frame buffer.

12. The image display system as set forth in claim 10, wherein the frame buffer end address designates the last line of the frame buffer.

13. The image display system as set forth in claim 10, wherein the priority information of the master blocks represents an output sequence of the writing and reading addresses.

14. A method of displaying an image in an image display system having a frame buffer that includes a plurality of lines, the method comprising:

generating writing and reading addresses;

comparing the writing address with the reading address and comparing a burst length stored in the system with a difference between the reading and writing addresses;

alternatively conducting writing and reading operations for the frame buffer in response to a result of the comparison of the burst length stored in the system with the difference between the reading and writing addresses; and displaying image data, that is read from the frame buffer, by the reading operation, wherein the reading address contains a start address for the reading operation and the writing address contains a start address for the writing operation, wherein alternatively conducting the writing and reading operations is comprised of holding the writing operation to the frame buffer and conducting the reading operation in response to the comparison result if the writing and reading addresses are the same or a difference between the start addresses for the reading and writing operations is less than the burst length.

15. The method as set forth in claim 14, wherein the writing operation is carried out by receiving the writing address and image data and storing the externally provided image data in a line of the frame buffer that is designated by the writing address.

16. The method as set forth in claim 14, wherein the reading operation is carried out by receiving the reading address and reading the image data from a line of the frame buffer that is designated by the reading address.

17. The method as set forth in claim 14, wherein the writing address designates a line of the frame buffer to store the image data.

18. The method as set forth in claim 14, wherein the reading address designates a line of the frame buffer in which the image data is stored.

19. The method as set forth in claim 14, wherein the writing operation is faster than the reading operation.

20. The method as set forth in claim 14, wherein comparing the writing address, the reading addresses, and the burst length comprises:

storing a frame buffer start address, a frame buffer end address, the burst length, and priority information of master blocks;

providing the writing and reading addresses;

comparing the writing address with the reading address and comparing the burst length with a difference between the start addresses for the reading and writing operations if the writing and reading addresses are interposed between the frame buffer start and end addresses; and providing the priority information of the master blocks and controlling the writing and reading addresses to be alternatively output in response to a result of the comparison of the burst length with the difference between the start address for the reading and writing operations and the priority information of the master blocks, wherein controlling the writing and reading addresses to be alternatively output is carried out by outputting the reading address and holding the writing address in response to the comparison result and the priority information of the master blocks if the writing and reading addresses are the same or if the difference between the start addresses for the reading and writing operations is less than the burst length.

21. The method as set forth in claim 20, wherein the frame buffer start address designates the first line of the frame buffer.

22. The method as set forth in claim 20, wherein the frame buffer end address designates the last line of the frame buffer.

23. The method as set forth in claim 20, wherein the priority information of the master blocks represents an output sequence of the writing and reading addresses.

* * * * *